US008116369B2

(12) United States Patent
Choi et al.

(10) Patent No.: US 8,116,369 B2
(45) Date of Patent: Feb. 14, 2012

(54) MULTI-DISPLAY SUPPORTING MULTI-VIEW VIDEO OBJECT-BASED ENCODING APPARATUS AND METHOD, AND OBJECT-BASED TRANSMISSION/RECEPTION SYSTEM AND METHOD USING THE SAME

(75) Inventors: Yun jung Choi, Daejon (KR); Suk-Hee Choi, Daejon (KR); Kug Jin Yun, Daejon (KR); Jinhwan Lee, Daejon (KR); Young Kwon Hahm, Daejon (KR); Chieteuk Anh, Daejon (KR)

(73) Assignee: Electronics and Telecommunications Research Institute (KR)

( * ) Notice: Subject to any disclaimer, the term of this patent is extended or adjusted under 35 U.S.C. 154(b) by 1238 days.

(21) Appl. No.: 10/526,243

(22) PCT Filed: Dec. 11, 2002

(86) PCT No.: PCT/KR02/02340
§ 371 (c)(1),
(2), (4) Date: Oct. 21, 2005

(87) PCT Pub. No.: WO2004/021711
PCT Pub. Date: Mar. 11, 2004

(65) Prior Publication Data
US 2006/0153289 A1 Jul. 13, 2006

(30) Foreign Application Priority Data
Aug. 30, 2002 (KR) .................. 10-2002-0052146

(51) Int. Cl.
*H04N 7/12* (2006.01)
*H04N 11/02* (2006.01)
*H04N 11/04* (2006.01)
*H04N 13/00* (2006.01)
*H04N 13/02* (2006.01)
*H04N 13/04* (2006.01)

(52) U.S. Cl. .......... 375/240.01; 348/42; 348/48; 348/51
(58) Field of Classification Search .............. 375/240.28
See application file for complete search history.

(56) References Cited

U.S. PATENT DOCUMENTS
5,416,510 A * 5/1995 Lipton et al. .................. 348/43
(Continued)

FOREIGN PATENT DOCUMENTS
CN 1129882 A 8/1996
(Continued)

OTHER PUBLICATIONS
Woods, A.; Docherty, T.; Koch, R. "3D Video Standards Conversion", Stereoscopic Displays and Applications VII, Proceedings of the SPIE vol. 2653A, Feb. 1996.

(Continued)

*Primary Examiner* — Jay Au Patel
*Assistant Examiner* — Jessica Prince
(74) *Attorney, Agent, or Firm* — Blakely, Sokoloff, Taylor & Zafman

(57) ABSTRACT

Provided are a multi-display supporting multi-view video object-based encoding apparatus and method, and an object-based transmission/reception system and method using the encoding apparatus and method. The encoding apparatus includes: a shape abstracting means for receiving right/left-eye image object video and abstracting right/ left object image, respectively, to abstract the shape information of a multi-view video; a data separating means for receiving the right/left-eye image object video, and the right/left shape information, and separating them into odd-field objects and even field objects to transmit only the essential bit streams for a user display mode; a shape compensation means for compensating for the distortion of the shape information separated into odd and even fields; and an object-based encoding means for receiving the object-based information from the shape compensation means and the object-based information from the data separating means, forming four layers, and performing motion and disparity estimation to encode object-based data that are separated into odd and even lines.

19 Claims, 9 Drawing Sheets

U.S. PATENT DOCUMENTS

| | | | |
|---|---|---|---|
| 5,574,504 A | 11/1996 | Yagasaki et al. | |
| 5,612,735 A | 3/1997 | Haskell et al. | |
| 5,619,256 A | 4/1997 | Haskell et al. | |
| 5,633,682 A | 5/1997 | Tahara | |
| 5,771,357 A | 6/1998 | Kato et al. | |
| 5,946,043 A * | 8/1999 | Lee et al. | 375/240.24 |
| 5,973,741 A | 10/1999 | Takashima et al. | |
| 6,055,012 A * | 4/2000 | Haskell et al. | 348/48 |
| 6,057,884 A * | 5/2000 | Chen et al. | 375/240.16 |
| 6,574,423 B1 * | 6/2003 | Oshima et al. | 386/111 |
| 2002/0009137 A1 * | 1/2002 | Nelson et al. | 375/240.1 |

FOREIGN PATENT DOCUMENTS

| | | |
|---|---|---|
| CN | 1154630 A | 7/1997 |
| CN | 1215288 A | 4/1999 |
| EP | 0 831 657 A2 | 3/1998 |
| EP | 1 021 043 A2 | 7/2000 |
| EP | 1 187 495 | 3/2002 |
| JP | 06-098314 | 8/1994 |

OTHER PUBLICATIONS

Tzovaras, D.; Grammalidis, N.; Strintzis, M.G. "Object-Based Coding of Stereo Image Sequences Using Joint 3-D Motion/Disparity Compensation" Circuits and Systems for Video Technology, IEEE Transactions on, vol. 7, Issue 2, Apr. 1997, pp. 312-727.

Strintzis, M.G.; Malassiotis, S "Object-Based Coding of Stereoscopic and 3D Image Sequences "IEEE Signal Processing Magazine, vol. 16, Issue 3, May 1999, pp. 14-28.

J-R Ohm, "Encoding and Reconstruction of Multiview Video Objects", IEEE Signal Processing Magazine, vol. 16, No. 3, pp. 47-54, May 1, 1999.

Surman P., "Stereoscopic and Autostereoscopic Display Systems", IEEE Signal Processing Magazine, pp. 85-99, May 1, 1999.

Yunjung Choi et al., "Field-Based Stereoscopic Video CODEC for Multiple Display Methods", International Conference on Image Processing (ICIP), vol. 2, pp. 253-256, Sep. 22, 2002.

"Final Text of 13818-2/AMD 3", ITU Study Group 16—Video Coding Experts Group—ISO/EIC MPEG & ITU-T VCEG (ISO/IEC JTC1/SC29/WG11 And ITU-T SG16 Q6), No. N1366, Oct. 3, 1996.

* cited by examiner

MULTI-DISPLAY SUPPORTING MULTI-VIEW VIDEO OBJECT-BASED ENCODING APPARATUS AND METHOD, AND OBJECT-BASED TRANSMISSION/RECEPTION SYSTEM AND METHOD USING THE SAME The present patent application is a non-provisional application of International Application No. PCT/KR2002/002340, filed Dec. 11, 2002.

TECHNICAL FIELD

The present invention relates to a multi-display supporting multi-view video object-based encoding apparatus and method, and an object-based transmission/reception system and method using the multi-view video object-based encoding apparatus and method; and, more particularly, to a multi-view video object-based encoding apparatus and method that can remove temporal and spatial redundancies by transmitting an essential encoded bit stream for a corresponding display mode and using a technology related to the motion and disparity of a shape or texture having an encodable structure, and an object-based transmission/reception system and method using the multi-view video object-based encoding apparatus and method.

BACKGROUND ART

A two-dimensional image is composed of monocular images on a single temporal axis, while a three-dimensional image is composed of multi-view images having two or more views, on a single temporal axis. Among the multi-view video encoding methods is a binocular video encoding method that encodes video images of two views corresponding to both eyes to display stereoscopic image. MPEG-2 MVP, which performs non-object-based encoding and decoding, is a representative method for non-object-based binocular video encoding. Its base layer has the same architecture of the base layer of the MPEG-2 main profile (MP), where encoding is performed by using only one image between the right-eye image and the left-eye image. Therefore, an image encoded in the MPEG-2 MVP method can be decoded with a conventional two-dimensional video decoder, and it can be also applied to a conventional two-dimensional video display mode. In short, it is compatible with a conventional two-dimensional video system.

An image of the enhancement layer is encoded using correlation information between the right and left images. That is, the MPEG-2 MVP method is based on an encoder that uses temporal scalability. Also, the base layer and the enhancement layer output frame-based two-channel bit streams each corresponding to the right and left-eye image. Current technologies related to binocular three-dimensional video encoding is based on the two-layer MPEG-2 MVP encoder. Also, the frame-based two-channel technology corresponding to the right and left-eye images in the base layer and the enhancement layer is based on the two-channel MPEG-2 MVP encoder.

U.S. Pat. No. 5,612,735 'Digital 3D/Stereoscopic Video Compression Technique Utilizing Two Disparity Estimates,' granted on Mar. 18, 1997, discloses the related technology. This patent relates to a non-object-based encoding method that utilizes temporal scalability, and encodes a left-eye image in the base layer by using motion compensation and DCT-based algorithm, and encodes a right-eye image in the enhancement layer by using disparity information between the base layer and the enhancement layer, without using motion compensation between right-eye images, which is shown in FIG. 1.

FIG. 1 is a diagram showing a conventional method for estimating disparity compensation, which is performed twice. In the drawing, I, P and B denote three screen types defined in the MEPG standard. The screen I (Intra-coded) exists only in the base layer, and the screen is simply encoded without using motion compensation. In the screen P (predicated), motion compensation is performed using the screen I or another screen P. In the screen B (Bi-directional predicted coded), motion compensation is performed using the two screens that exist before and after the screen B on the temporal axis. The encoding order in the base layer is the same as that of MPEG-2 MP.

In the enhancement layer, only screen B exists. The screen B is encoded by using disparity compensation from the frame exiting on the same temporal axis and the screen existing after the frame.

Related prior art is disclosed in U.S. Pat. No. 5,619,256, 'Digital 3D/Stereoscopic Video Compression Technique Utilizing Disparity and Motion Compensated Predictions,' which is granted on Apr. 8, 1997. This method of U.S. Pat. No. 5,619,25 is also non-object-based. It utilizes temporal scalability, and encode a left-eye image in the base layer by using motion compensation and a DCT-based algorithm, and in the enhancement layer, it uses motion compensation between right-eye images and the disparity information between the base layer and the enhancement layer.

As shown above, there are various estimation methods for motion compensation and disparity compensation to perform encoding. The method of FIG. 2, which shows a conventional method for estimate motion and disparity compensation, is one known representative estimation method. In the base layer of FIG. 2, screen estimation is performed in the same estimation method of FIG. 1. The screen P of the enhancement layer is estimated from the screen I of the base layer to perform disparity compensation. Also, the screen B of the enhancement layer is estimated from the screen before in the same enhancement layer and the screen of the base layer on the same temporal axis to perform motion compensation and disparity compensation.

The two prior arts transmit only the bit stream outputted from the base layer, when the receiving end uses two-dimensional monocular display mode, and transmits all the bit streams outputted from the base layer and the enhancement layer to restore an image, when the receiving end adopts three-dimensional frame-based time lag display mode. However, when the display mode of the receiving end is a three-dimensional field-based time lag display mode, which is adopted in most PCs, the methods of the two patents have problems that the amount of image restoration and the decoding time delay are increased in the decoder and the transmission efficiency is decreased, because the inessential data, the even field object of a left-eye image and the odd field image of a right-eye image, should be dismissed.

There is a video encoding method that reduces right and left-eye images by half and transforms the right and left two-channel images into one-channel image. For this, five methods are disclosed in '3D Video Standards Conversion', Andrew Woods, Tom Docherty and Rolf Koch, Stereoscoic Displays and Applications VII, California, Feb, 1996, Proceedings of the SPIE Vol.2653a.

In connection with the above technique, a method is suggested in U.S. Pat. No. 5,633,682, 'Stereoscopic Coding System,' granted on May 27, 1997. The non-object-based MPEG encoding of a conventional two-dimensional video image is performed by selecting the odd fields of a left-eye image and the even fields of a right-eye image and converting the two-channel image into one-channel image. This method has an advantage that the conventional MPEG encoding of a two-dimensional video image can be used, and when the field estimation is performed in the encoding process, the motion and disparity information can be used naturally. However, in case where frame estimation is performed, only motion information is used and disparity information is not considered. Also, when field estimation is performed, although the most correlated image is one that exists on the same temporal axis, the screen B is estimated from the screen I and the screen P that exist before and after the screen B to perform disparity compensation, although the most correlated image is not the screens I and P but another screen on the same temporal axis in the other part.

In addition, this method considers field-based time lag to display right and left images one after another on a field basis to form a three-dimensional video image. Accordingly, this method is not proper to a frame-based time lag display mode, in which the right and left-eye images are displayed simultaneously. Therefore, a method that employs an object-based encoder and decoder and restores an image by transmitting only essential bit streams according to the display mode of the receiving part, i.e., two-dimensional monocular display mode or three-dimensional video field/frame-based time lag display mode, is required in this technical field.

DISCLOSURE OF INVENTION

It is, therefore, an object of the present invention to provide an object-based encoding apparatus and method, in which a pair of multi-view object images for the right eye and the left eyes, are separated on an even and odd field object, and encoded/decoded in an object-based encoding/decoding method using a shape and texture in order to give a stereoscopic effect to a multi-view video, and an object-based transmission/reception system using the object-based encoding apparatus and method.

In accordance with one aspect of the present invention, there is provided a multi-display supporting multi-view video object-based encoding apparatus, comprising: a shape abstracting means for receiving a left-eye image object video (L) and a right-eye image object video (R) from outside and abstracting a left object image (LS) and a right object image (RS), respectively, to abstract the shape information of a multi-view video; a data separating means for receiving the right/left-eye image object video (L/R) from outside, and the right/left shape (LS/RS) information transmitted from the shape abstracting means, and separating the videos and the shape information into odd field objects and even field objects to transmit only essential bit streams for a display mode of the multi-view video; a shape compensation means for compensating for the distortion of the shape information (shape of the (LO,LE)/(RO,RE) object) separated into odd and even fields by the data separating means; and an object-based encoding means for receiving the object-based information inputted from the shape compensation means and the object-based information inputted from the data separating means, forming four layers, i.e., LO stream, LE stream, RO stream and RE stream, and performing motion, and disparity estimation based on shape encoding and shape texture to encode object-based data that are separated into odd and even lines.

In accordance with one aspect of the present invention, there is provided a multi-display supporting multi-view video object-based encoding method and applied to a multi-view video object-based encoding apparatus, comprising the steps of: a) receiving a left-eye image object video (L) and a right-eye image object video (R) from outside and abstracting a left object image (LS) and a right object image (RS), respectively, to abstract the shape information of a multi-view video; b) receiving the left-eye image object video (L) and the right-eye image object video (R) from outside, and the right/left shape (LS/RS) information transmitted from the step a), and separating the videos and the shape information into odd and even field objects to transmit only essential bit streams for a display mode of the multi-view video; c) compensating for the distortion of the shape information (shape of the (LO,LE)/(RO, RE) object) separated into odd and even fields; and d) receiving the compensated object-based information and the separated object-based information, forming four layers, i.e., LO stream, LE stream, RO stream and RE stream, and performing motion and disparity estimation based on shape encoding and shape texture to encode the object-based data that are separated into odd and even lines.

In accordance with one aspect of the present invention, there is provided a multi-display supporting multi-view video object-based transmission system, comprising: an object-based encoding means for receiving right and left two-channel videos (L and R) for the right and left eyes from outside, separating the videos into odd and even field objects, respectively, i.e., an odd field object (LO) of the left-eye image, an even field object (RE) of the right-eye image, an even field object (LE) of the left-eye image, and an odd field object (RO) of the right-eye image, forming a main layer and sub-layers out of the separated field objects, and performing encoding, so as to transmit only essential bit streams needed for a transmitting/receiving end in accordance with a binocular three-dimensional video display mode; and a system multiplexing means for receiving the bit streams of the odd field object (LO) of the left-eye image, the even field object (RE) of the right-eye image, the even field object (LE) of the left-eye image, and the odd field object (RO) of the right-eye image, which are transmitted from the object-based encoding means, and the user display information, and multiplexing only essential bit streams.

In accordance with one aspect of the present invention, there is provided a multi-display supporting multi-view video object-based reception system, comprising: a system demultiplexing means for demultiplexing the bit stream transmitted from outside based on a user display mode, and outputting the demultiplexed bit stream into a multi-channel bit stream; an object-based decoding means for decoding the multi-channel, i.e., 2-channel or 4-channel, object-based bit stream based on the user display mode; and a display means for performing two-dimensional video display or binocular field/frame-based time lag display based on the request from the user so as to display a video restored by the object-based video decoding means.

In accordance with one aspect of the present invention, there is provided a multi-display supporting multi-view video object-based transmission method, comprising the steps of: a) receiving right and left two-channel images (L and R) for the right and left eyes from outside, separating the images into odd and even field objects, i.e., odd field object of the left-eye image (LO), even field object of the right-eye image (RE), even field object of the left-eye image (LE), and odd field object of the right-eye image (RO), forming a main layer and sub-layers of the separated field objects and perform encoding so that only essential bit streams needed for a transmitting/receiving end are transmitted in accordance with a binocular three-dimensional video display mode; and b) receiving the encoded bit streams of the field objects, i.e., odd field object of the left-eye image (LO), even field object of the right-eye image (RE), even field object of the left-eye image (LE), and odd field object of the right-eye image (RO), and the user display information, and multiplexing only the essential bit streams.

In accordance with one aspect of the present invention, there is provided a multi-display supporting multi-view video object-based receiving method, comprising the steps of: a) demultiplexing the bit stream transmitted from a system multiplexing unit, and outputting the demultiplexed bit stream into a multi-channel bit stream based on a user display mode; b) decoding the multi-channel, i.e., two-channel or four-channel, input object-based bit stream based on the user display mode; and c) performing two-dimensional video display or binocular field/frame-based time lag display upon the request from a user to display the image restored in the step b).

The method of the present invention considers three display modes, i.e., a field-based time lag display mode, a frame-based time lag display mode, and a two-dimensional monocular display mode for a user terminal display. It obtains a multi-view binocular stereoscopic effect by selecting a pair of object video images suitable for binocular condition among other multi-view images. The two-view images are encoded by using an object-based binocular video encoding method that uses the motion and disparity estimation of shape and texture.

Before the encoding, each right and left object video images are divided into four field objects, odd lines and even lines for each video image, and encoded using the motion and disparity information of the shape and texture. Among the four encoded bit streams, only essential bit streams required by a user display mode is multiplexed and transmitted. In the receiving end, the received bit stream is demultiplexed and the image is restored based on the required user display mode, although part of the four bit streams are received. In case where the receiving end uses a three-dimensional video field-based time lag display mode and the two-dimensional video display mode, the MPEG-2 MVP-based binocular three-dimensional decoding apparatus, which performs decoding using all the two encoded bit streams outputted from the base layer and the enhancement layer, requires all the data to be transmitted thereto, although it should dismiss half of the transmitted data. Therefore, the transmission efficiency is decreased, and the decoding time becomes long.

On the other hand, the encoding apparatus of the present invention transmits only an essential field object, required by each user display for decoding, thereby minimizing the unnecessary channel occupation by inessential data transmission and the delay in decoding time.

The encoding and decoding method employs a multi-layer encoding technique, in which the odd and even field objects of the right and left images are inputted to thereby form four encoding layers. The four layers are classified into main layers and sub layers based on the estimation relations between the field objects. The receiving end can perform decoding only with the encoded bit stream for a field object corresponding to a main layer. The bit stream for a field object corresponding to a sub-layer cannot be decoded alone, but can be decoded depending on the bit stream for the main layer with itself.

The structures of the main layer and the sub-layer are described below. The odd field object of the left-eye image is taken for a main layer and encoded/decoded independently. Then, the even field object of the right-eye image, the even field object of the left-eye image, and the odd field object of the right-eye image become a first sub-layer, a second sub-layer, and a third sub-layer. The sub-layers use the information of the main layer and the other sub-layers.

The odd field object bit stream of the left-eye image encoded in the main layer is transmitted basically, regardless of the user display mode. In case where the user uses a field-based time lag display mode, the bit streams outputted from the main layer and the first sub-layer are multiplexed and transmitted, and in case where he uses a frame-based time lag display mode, the bit streams outputted from the main layer and all the three sub-layers are multiplexed and transmitted. Also, in case where the user uses a two-dimensional video display, only the left-eye image is restored and displayed by transmitting the bit stream outputted from the main layer and the second sub-layer. Although all the existing object information cannot be used when the sub-layers are encoded/decoded, this method is useful to transmit a three-dimensional image to those without a binocular display apparatus, because the image is converted into a two-dimensional video.

Therefore, the object-based encoding/decoding apparatus has an effect of reducing display delay by enhancing transmission efficiency and simplifying the decoding process, because only essential bit streams are transmitted in accordance with the user display mode, i.e., two-dimensional monocular display mode, or binocular video field/frame-based time lag display mode so as to make the receiving end perform decoding.

BRIEF DESCRIPTION OF DRAWINGS

The above and other objects and features of the present invention will become apparent from the following description of the preferred embodiments given in conjunction with the accompanying drawings, in which.

BEST MODE FOR CARRYING OUT THE INVENTION

Other objects and aspects of the invention will become apparent from the following description of the embodiments with reference to the accompanying drawings, which is set forth hereinafter.

Figure 1:
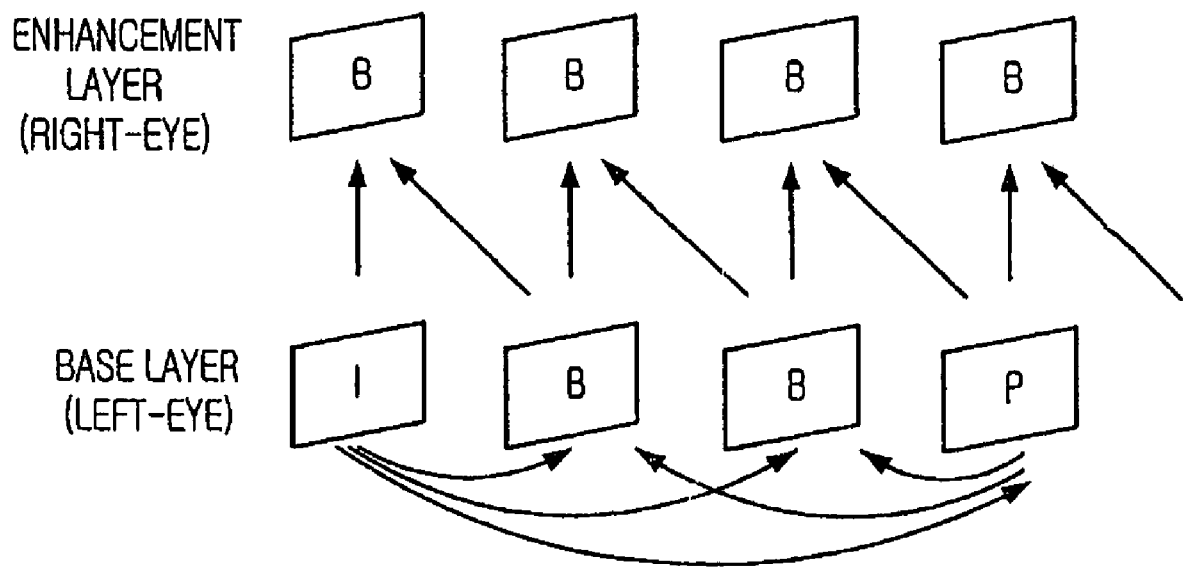
FIG. 1 is a diagram showing a conventional method for estimating disparity compensation performed twice.
Figure 2:
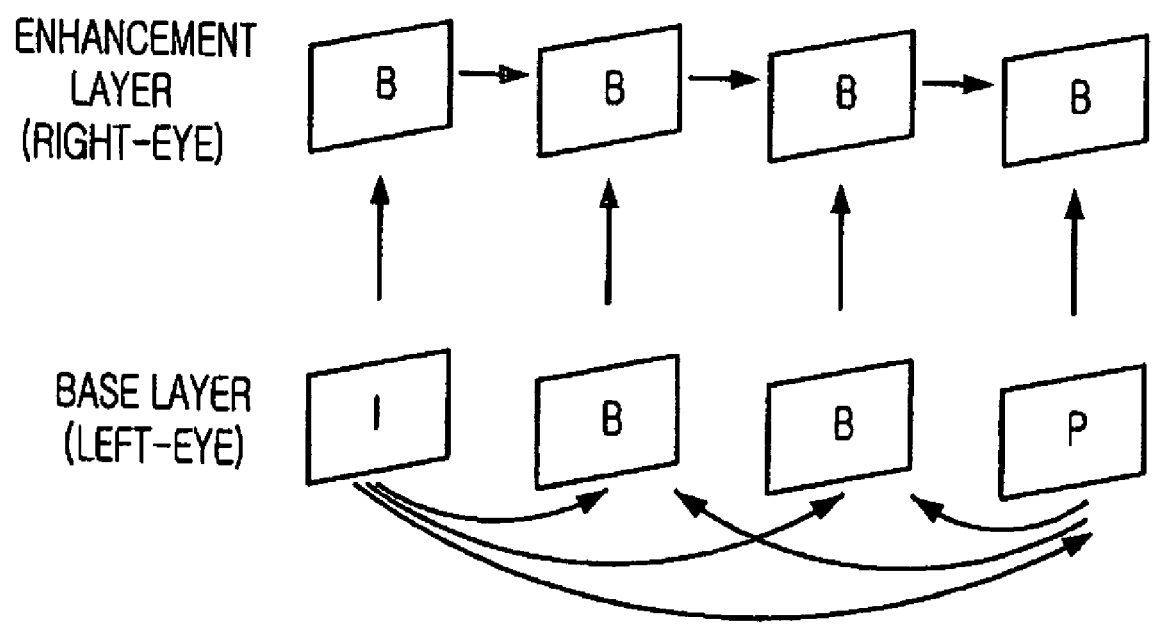
FIG. 2 is a diagram illustrating a conventional method for estimating motion and disparity compensation.
Figure 3:
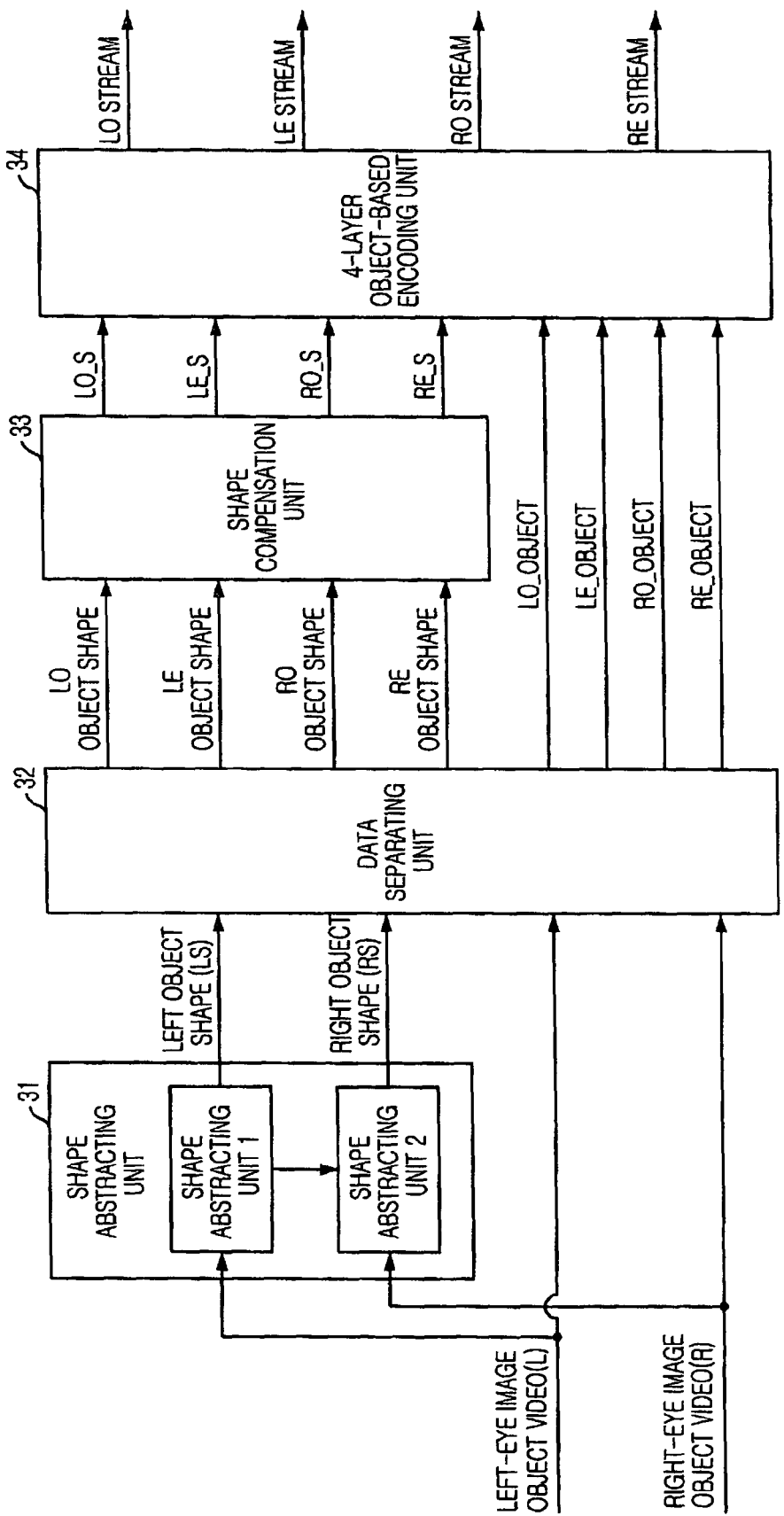
FIG. 3 is a block diagram describing a structure of a multi-view video object-based encoding apparatus in accordance with an embodiment of the present invention.

FIG. 3 is a block diagram describing a structure of a multi-view video object-based encoding apparatus in accordance with an embodiment of the present invention. As shown in the drawing, the multi-view video object-based encoding apparatus of the present invention includes a shape abstracting unit 31 for receiving a left-eye image object video (L) and a right-eye image object video (R) from outside and abstracting a left object image (LS), and a right object image (RS), respectively, to abstract the shape information of a multi-view three-dimensional video; a data separating unit 32 for receiving the left-eye image object video (L) and the right-eye image object video (R) from outside, and the right/left shape (LS/RS) information transmitted from the shape abstracting unit 31, and separating them into odd and even field objects to transmit only the essential bit streams necessary for a binocular three-dimensional video display mode; a shape compensation unit 33 for compensating for the distortion of the shape information (shape of the (LO,LE)/(RO,RE) object) separated into odd and even fields by the data separating unit 32; and a 4-layer object-based encoding unit 34 for receiving the object-based information inputted from the shape compensation unit 33 and the object-based information inputted from the data separating unit 32, forming four layers, i.e., LO stream, LE stream, RO stream and RE stream, and performing motion and disparity estimation based on shape encoding and shape texture to encode the object-based data that are separated into odd and even lines.

Here, the shape abstracting unit 31 uses the left-eye image as the reference view, and it includes a shape abstracting unit 1 and a shape abstracting unit 2 for receiving the left-eye image object video (L) and the right-eye image object video (R), respectively. In case where the shape information abstracted from the left-eye image is referred to in the right-eye image processing, the shape abstracting unit 2 that receives the right-eye image refers to the shape information of the left-eye image and abstracts the right-eye image shape from the shape abstracting unit 1. In case where the shape information of the left-eye image is not referred to, the shape abstracting unit 2 operates independently from the shape abstracting unit 1, The data separating unit 32 receives the left object image (LS) and the right object image (RS) corresponding to the shape information and outputs field-based shape information. It also receives the left-eye image object video (L) and the right-eye image object video (R), and outputs the odd field object (LO) of the left-eye image, the even field object (RE) of the right-eye image, the even field object (LE) of the left-eye image, and the odd field object (RO) of the right-eye image.

The shape compensation unit 33 compensates the field object-based shapes outputted from the data separating unit 32 for the shape distortion that may be caused by separating the shape information into discontinuous fields.

Figure 4:
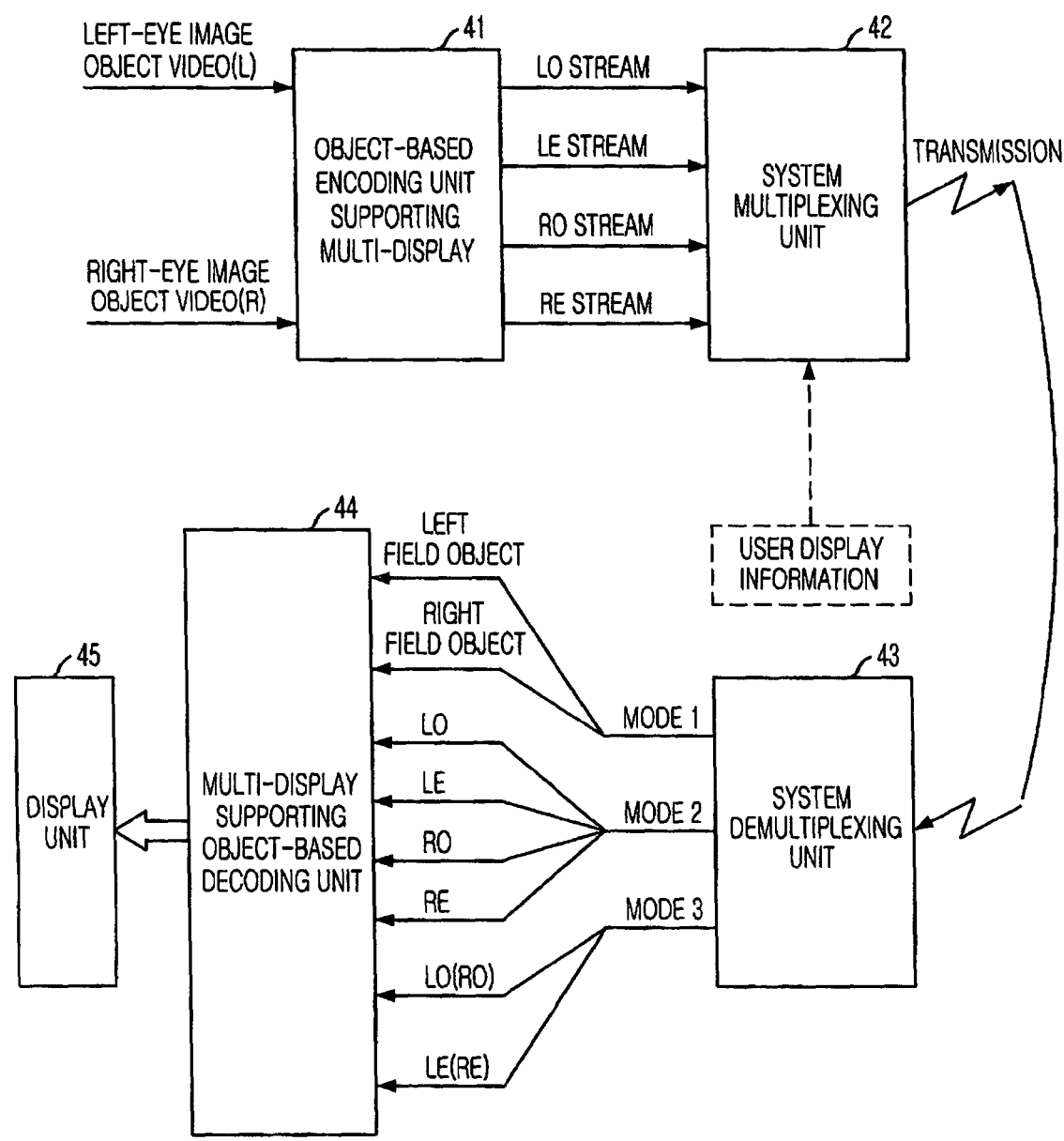
FIG. 4 is a block diagram showing a structure of an object-based transmission/reception system using a multi-view video object-based encoding apparatus in accordance with an embodiment of the present invention.

The 4-layer object-based encoding unit 34 is formed of four layers for processing the field objects to encode the object-based data separated into odd and even lines FIG. 4 is a block diagram showing a structure of an object-based transmission/reception system using a multi-view video object-based encoding apparatus in accordance with an embodiment of the present invention. The object-based transmission/reception system includes a transmitting end provided with a multi-display supporting object-based encoding unit 41 and a system multiplexing unit 42, and a receiving end provided with a system demultiplexing unit 43, a multi-display supporting object-based decoding unit 44, and a display unit 45.

The transmission system includes a multi-display supporting object-based encoding unit 41 for receiving right and left two-channel videos (L and R) from outside, separating the videos into odd and even field objects, respectively, i.e., an odd field object (LO) of the left-eye image, an even field object (RE) of the right-eye image, an even field object (LE) of the left-eye image, and an odd field object (RO) of the right-eye image, forming a main layer and sub-layers out of the separated field objects, and performing encoding, so as to transmit only the essential bit streams for a transmission end and a reception end in accordance with a binocular three-dimensional video display method; and a system multiplexing unit 42 for receiving the bit streams of the odd field object (LO) of the left-eye image, the even field object (RE) of the right-eye image, the even field object (LE) of the left-eye image, and the odd field object (RO) of the right-eye image, which are transmitted from the object-based encoding unit 41, and the user display information, and multiplexing only the essential bit streams.

Figure 5:
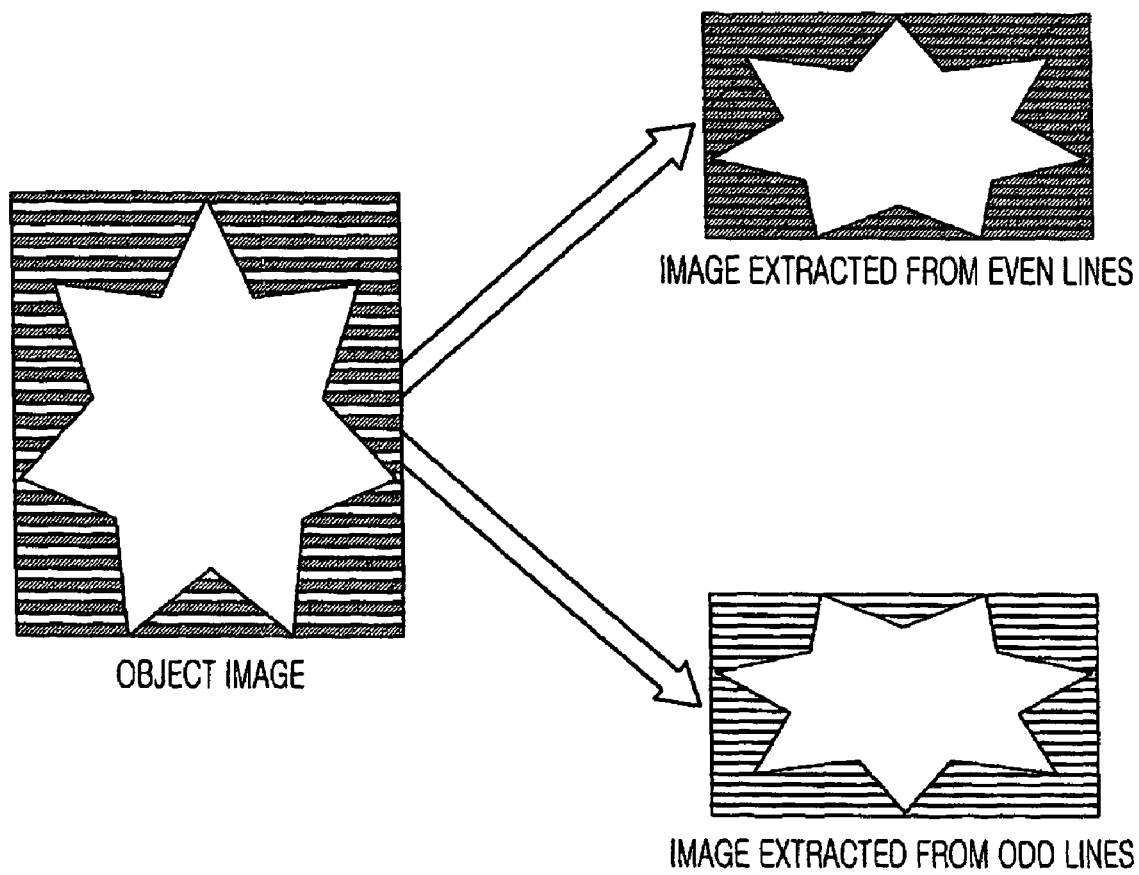
FIG. 5 is an exemplary view showing an odd/even field object separator for separating an object image into an odd field object and an even field object in accordance with an embodiment of the present invention.

Here, the separator of the multi-display supporting object-based encoding unit 41 separates right and left two-channel videos into odd and even field objects, and outputs four-channel input images. The separator also separates a right or left-eye video object into odd lines and even lines based on the first line of the image, as described in FIG. 5. In addition, the separator separates the image input into four separated object-based layers so as to perform motion and disparity estimation using shape and texture and transmit only the essential bit streams needed for a display mode.

The multi-display supporting object-based encoding unit 41 forms a main layer and sub-layers out of the four-channel odd/even field objects separated from a pair of right and left-eye images to encode the field object video separated into odd lines and even lines.

The system multiplexing unit 42 receives the bit streams of the odd field object (LO) of the left-eye image, the even field object (RE) of the right-eye image, the even field object (LE) of the left-eye image, and the odd field object (RO) of the right-eye image, and the user display information, and multiplexes only the essential bit streams. The system multiplexing unit 42 performs the multiplexing suitably for three display modes. To describe it in detail, in case of the mode 1 (binocular field-based time lag display), the bit streams of LO and RE corresponding to the information half of the right and left images. In case of the mode 2 (binocular frame-based time lag display mode), the four encoded bit streams, LO, LE, RO and RE, are multiplexed, because all the information in the right and left image frames are used. In case of the mode 3 (two-dimensional monocular display mode), the encoded bit streams of LO and LE are multiplexed and transmitted to express the left-eye image between the right and left-eye images.

The reception system includes a system demultiplexing unit 43 for demultiplexing the bit stream transmitted from the system multiplexing unit 42 based on a user display mode, and outputting the demultiplexed bit stream into a multi-channel bit stream; a multi-display supporting object-based decoding unit 44 for decoding the multi-channel, i.e., 2-channel or 4-channel, object-based bit stream, which is inputted based on the user display mode; and a display unit 45 for performing two-dimensional video display or binocular field/frame-based time lag display upon the request from the user so as to display an image restored by the multi-display supporting object-based decoding unit 44.

Here, the system demultiplexing unit 43 demultiplexes the transmitted bit stream based on the user display mode, and outputs them into a multi-channel bit stream. In the modes 1 and 3, a two-channel encoded bit stream is outputted, and in the mode 2, a four-channel encoded bit stream is outputted.

The multi-display supporting object-based decoding unit 44 is a binocular video decoding apparatus, and it decodes a field object which is separated into odd lines and even lines, using the motion and disparity information of shape and texture. In addition, the multi-display supporting object-based decoding unit 44 decodes the two-channel or four-channel object-based bit stream that is inputted in accordance with the display mode from the system demultiplexing unit 43. It has the same layer architecture as the multi-display supporting object-based encoding unit 41.

Figure 7:
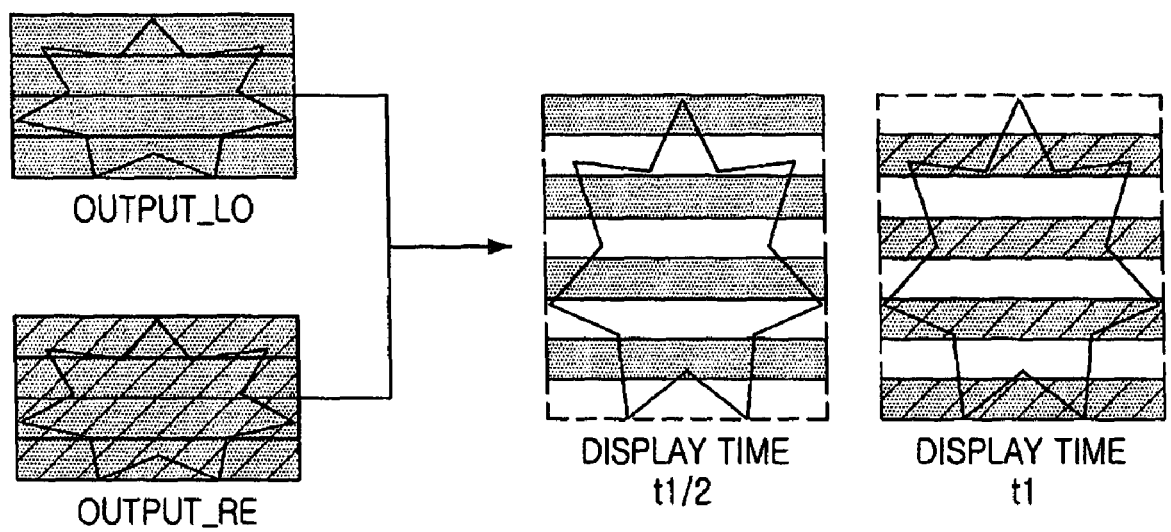
FIG. 7 is an exemplary view showing a binocular field-based time lag display method in accordance with the present invention.
Figure 8:
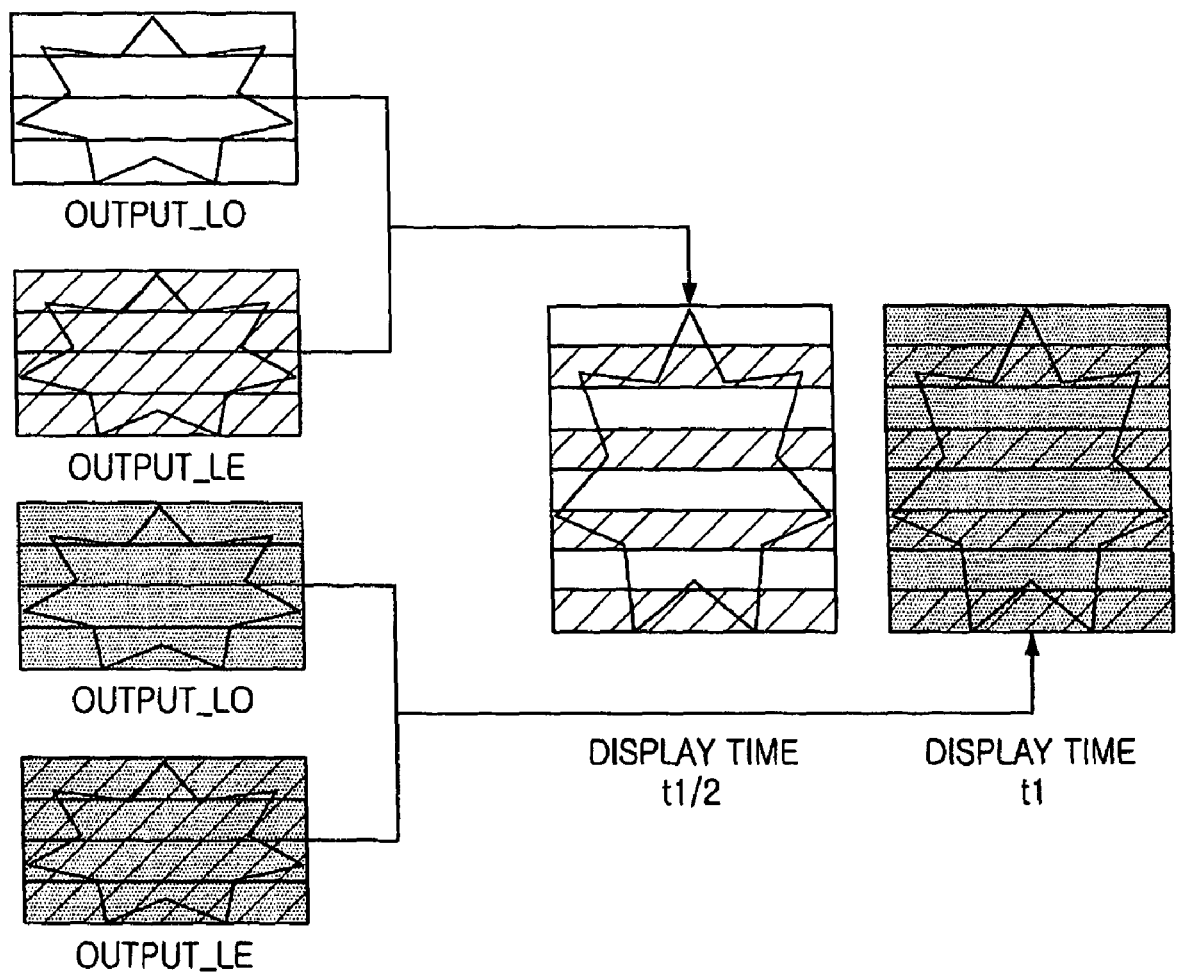
FIG. 8 is an exemplary view showing a binocular frame-based time lag display method in accordance with the present invention.
Figure 9:
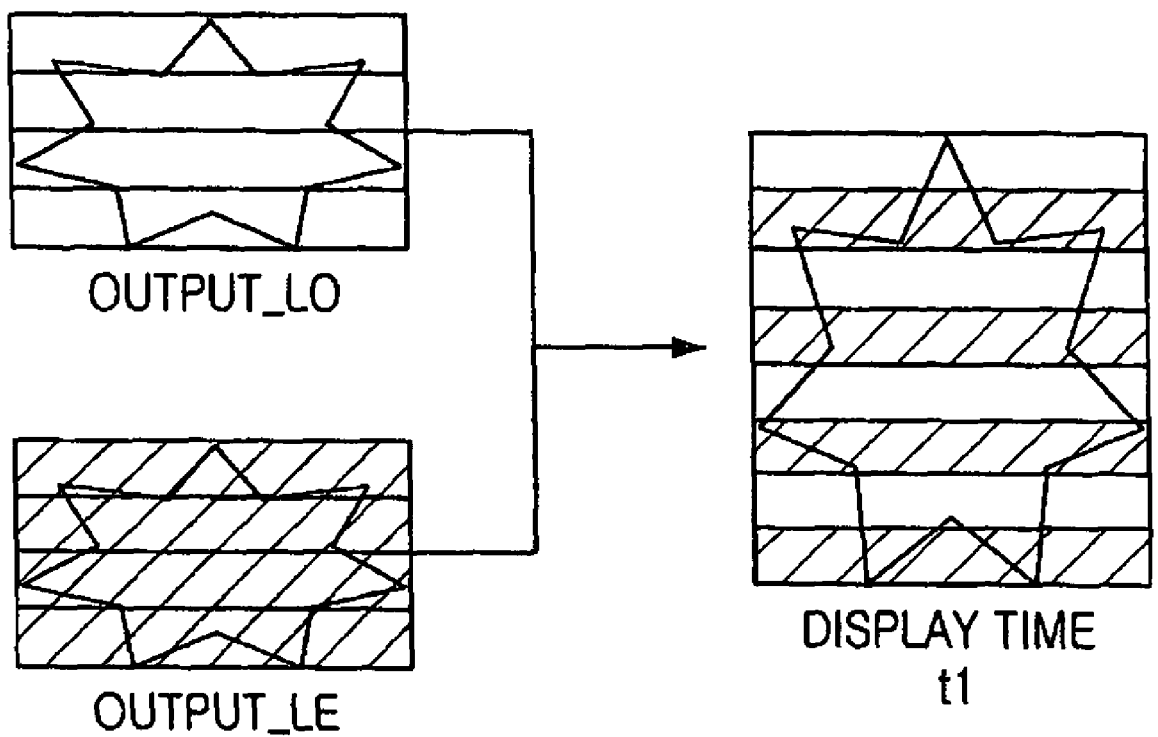
FIG. 9 is an exemplary view depicting a two-dimensional monocular display method in accordance with the present invention.

As illustrated in FIGS. 7 to 9, the display unit 45 selects a display mode among the three display modes, i.e., the two-dimensional video display, binocular field-based time lag display, or binocular frame-based time lag display, according to the request from the user and performs decoding to display an image restored by the multi-display supporting object-based decoding unit 44. That is, in the binocular field-based time lag display mode, as shown in FIG. 7, an output_LO restored from the odd field object of an image corresponding to the left-eye and an output_RE restored from the even field object corresponding to the right-eye are displayed at time t1/2 and t1, sequentially. In the binocular frame-based time lag display mode, as shown in FIG. 8, output_LO and output_LE, restored from the odd and even field objects of an image corresponding to the left-eye, respectively, are displayed at time t1/2, and output_RO and output_RE, restored from the odd and even field objects of an image corresponding to the right-eye, respectively, are displayed at time t1, sequentially. In the two-dimensional display mode, as shown in FIG. 9, output_LO and output_LE, or output_RO and output_RE, which will restore a one-eye image are displayed at time t1.

Figure 6:
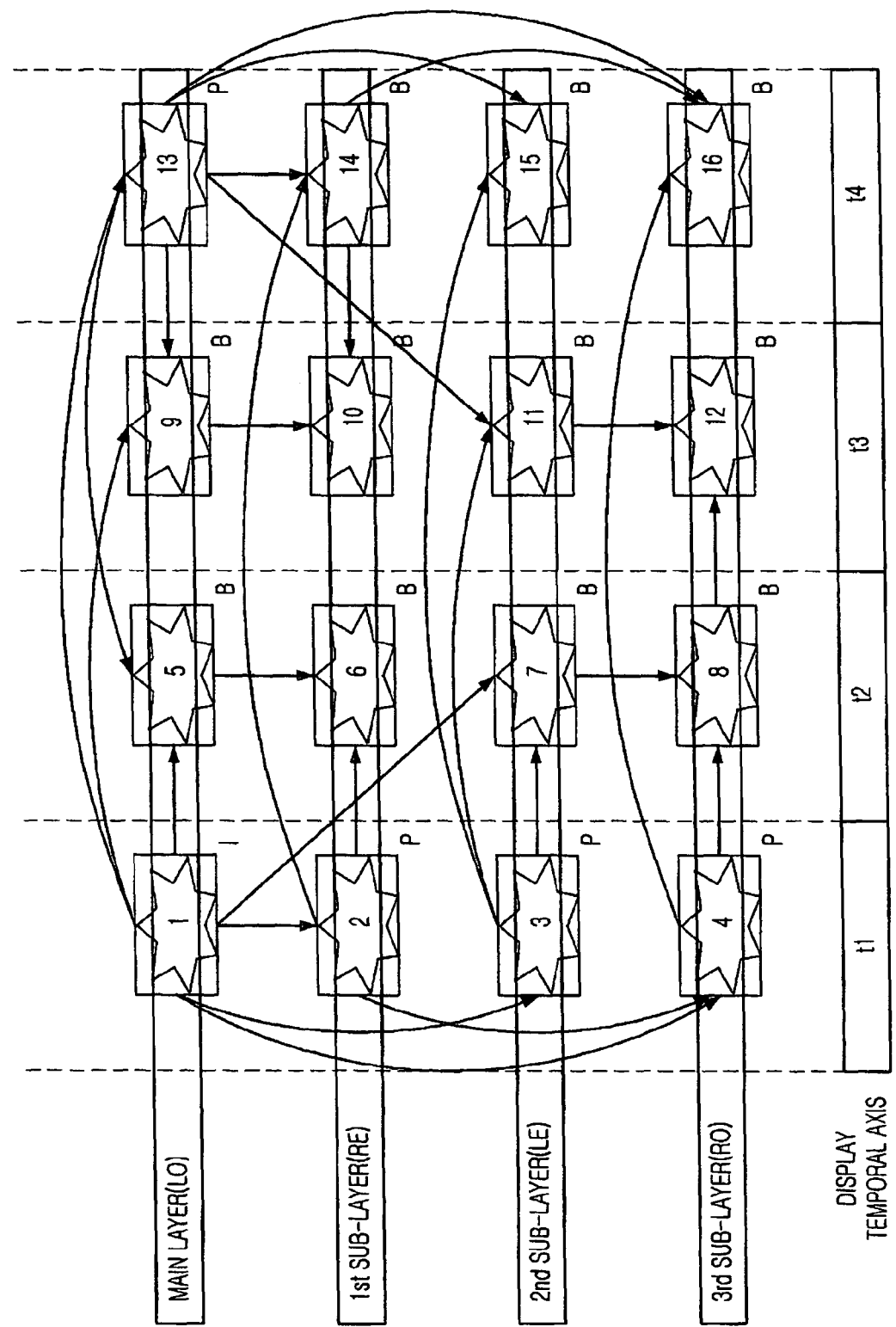
FIG. 6 is a diagram illustrating a method for estimating motion and disparity compensation of a shape and texture that support three or two-dimensional video display in accordance with an embodiment of the present invention.

As described above, the object-based encoding/decoding method of the present invention uses a multi-layer encoding technique, in which field objects separated into odd lines and even lines for the right and left images are received from the four encoding layers simultaneously. The four encoding layers forms a main layer and sub-layers based on the estimation relationship between the object image and the object texture. FIG. 6 shows an example.

FIG. 6 is a diagram illustrating a method for estimating motion and disparity compensation of a shape and texture that support three or two-dimensional video display in accordance with an embodiment of the present invention. As shown in the drawing, the field object 1 of the main layer existing at display time t1 is encoded into an object I, and the field object 2 of the first sub-layer is encoded into an object P by performing object disparity estimation based on the field object 1 on the same temporal axis of the main layer.

The field object 3 of the second sub-layer is encoded into an object P by performing object motion estimation based on the field object 1 of the main layer. The field object 4 of the third sub-layer is encoded by performing object disparity estimation based on the field object 1 of the main layer and object motion estimation based on the field object 2 of the first sub-layer.

The objects existing at a display time t4 of the layers are encoded and decoded. The field object 13 of the main layer is encoded into an object P by performing object motion estimation based on the field object 1. The field object 14 of the first sub layer is encoded into an object B by performing object disparity estimation based on the object field 13 of the main layer on the same temporal axis and object motion estimation based on the field object 2 of the same layer. The field object 15 of the second sub-layer is encoded into an object B by performing motion estimation based on the field object 13 of the main layer and the field object 3 of the same layer. The field object 16 of the third sub-layer is encoded into an object B by performing object disparity estimation based on the field object 13 of the main layer and object motion estimation based on the field object 14 of the first sub-layer.

The objects in each of the layers are encoded in the order of the display time t2 and t3. That is, the field object 5 of the main layer is encoded into an object B by performing object motion estimation based on the field objects 1 and 13 of the same layer. The field object 6 of the first sub-layer is encoded into an object B by performing object disparity estimation based on the field object 5 of the main layer on the same temporal akis and object motion estimation based on the field object 2 of the same layer. The field object 7 of the second sub-layer is encoded into an object B by performing object motion estimation based on the field object 1 of the main layer and the field object 3 of the same layer.

The field object 8 of the third sub-layer is encoded by performing object motion estimation based on the field object 4 of the same layer and object disparity estimation based on the field object 7 of the second sub-layer. The field object 9 of the main layer is encoded into an object B by performing object motion estimation based on the field objects 1 and 13. The field object 10 of the first sub-layer is encoded into an object B by performing object disparity estimation based on the field object 9 of the main layer on the same temporal axis and object motion estimation based on the field object 14 of the same layer. The field object 11 of the second sub-layer is encoded into an object B by performing object motion estimation based on the field objects 3 of the same layer and the field object 13 of the main layer. The field object 12 of the third sub-layer is encoded by performing object motion estimation based on the field object 8 of the same layer and object disparity estimation based on the field object 11 of the second sub-layer. Therefore, in the main layer, the object fields are encoded/decoded in the form of IPBB . . . , while those in the first, second and third sub-layers are encoded/decoded in the forms of PBBB . . . , PBBB and BBBB . . . , respectively.

In short, the multi-display supporting object-based encoding unit 41 uses shape and texture, when it performs motion and disparity estimation based on the inter-layer relationship that makes it possible to transmit only the essential bit streams to the transmitting/receiving end in accordance with the binocular three-dimensional video display mode. It also performs motion and disparity estimation using shape and texture based on the relationship between two layers that encode only the field objects needed for the two-dimensional monocular display mode, i.e., the odd and even field objects of the left-eye image, and the odd and even field objects of the right-eye image. The multi-display supporting object-based encoding unit 41 performs motion and disparity estimation using shape and texture based on the relationship between two layers that encode one field object of the left-eye image and one field object of the right-eye image, which are necessary for the three-dimensional field shuttering video display mode.

In addition, the multi-display supporting object-based decoding unit 44 uses shape and texture, when it performs motion and disparity estimation based on the inter-layer relationship that makes it possible to transmit only the essential bit streams to the transmitting/receiving end in accordance with the binocular three-dimensional video display mode. It also performs motion and disparity estimation using shape and texture based on the relationship between two layers that decode the field objects needed for the two-dimensional monocular display mode, i.e., the odd and even field objects of the left-eye image, and the odd and even field objects of the right-eye image. The multi-display supporting object-based decoding unit 44 performs motion and disparity estimation using shape and texture based on the relationship between two layers that decode one field object of the left-eye image and one field object of the right-eye image, which are necessary for the three-dimensional field shuttering video display mode.

The multi-view video object-based encoding/decoding apparatus of the present invention that supports the multi-display mode and has an architecture described above is operated as follows.

As described above, the present invention relates to a multi-view video object-based encoding/decoding technology that transmits only essential bit streams needed for a transmitting/receiving end in a binocular three-dimensional video display mode. The multi-view video object-based encoding/decoding is performed using the shape and texture information of an object. In the present invention, the object-based encoding/decoding is performed considering that the amount and shape of the essential data are different depending on the display mode for obtaining a binocular stereoscopic effect.

The encoding apparatus of the present invention separates an object image into odd lines and even lines and encodes the image in the form of an odd field object and an even field object to support a multi-display mode, which gives a binocular stereoscopic effect to a multi-view video. To perform object-based encoding, the encoding apparatus of the present invention abstracts shape information from the right-eye image the left-eye image. It also allows the shape information of the reference-view image to be referred to in the process of abstracting the other image shape. Therefore, not only binocular three-dimensional video but also multi-view three-dimensional video can be processed and displayed.

To support a multi-display mode, the right and left images and the right and left shape information are separated into odd lines and even lines, and then inputted into the encoding apparatus. Here, if the images are divided on a field basis, a shape distortion compensation should be carried out, because each of the field objects contains discontinuous image lines and thus shape information is distorted, which should be compensated for.

The encoding apparatus includes four layers for processing four inputs, i.e., an odd field object (RO) of the right-eye image, an even field object (RE) of the right-eye image, an odd field object (LO) of the left-eye image, and an even field object (LE) of the left-eye image. In the multiplexing process, among the four bit streams encoded in the respective four layers, only the essential bit streams are selected and multiplexed based on the user display mode, i.e., field-based time lag display mode, frame-based time lag display mode, and two-dimensional monocular display mode. Then, the multiplexed essential bit streams are transmitted.

Since each object video is separated into odd and even field objects and encoded, it is possible to transmit only the essential bit streams needed for the user display mode and minimize channel occupation by unnecessary multi-view video data. In addition, even though the display mode is changed, the encoding/decoding system can cope with it quickly without changing its encoding/decoding method, thus minimizing transmission and decoding time delay that may be caused by the change in the user display mode.

In case where a user uses a binocular field-based video time lag display mode, only two bit streams encoding the odd field object (LO) or even field object (LE) of the left-eye image and the odd field object (RO) or even field object (RE) of the right-eye image are transmitted and decoded. In case where the user uses a three-dimensional frame-based video time lag display mode, all the bit streams, i.e., the odd and even field objects (LO, LE, RO and RE) of the respective right and left-eye images, are transmitted and decoded.

When two-view images among multi-view images are paired as one single binocular group and transmitted in the object-based encoding/decoding process, the binocular images can be decoded by transmitting only the essential bit streams needed for a display mode, i.e., two-dimensional monocular display mode, or three-dimensional field/frame-based video time lag display mode. The binocular video encoding apparatus can be expanded into a multi-view video encoding apparatus by adding an encoding layer.

The method of the present invention abstracts a pair of object images corresponding to the right and left eyes, separates the videos into odd and even field objects, and performs object-based encoding/decoding based on the user display mode, i.e., field-based time lag display mode, frame-based time lag display mode, or two-dimensional monocular display mode.

The conventional encoding and decoding apparatus having an architecture of a base layer and an enhancement layer, such as MPEG-2 MVP, should transmit all the data to perform video decoding, even though half of the transmitted data should be dismissed during field shuttering. Therefore, the conventional method has low transmission efficiency and it takes a long decoding time. Also, since the conventional encoding method is not object-based, it is not compatible with the MPEG-4 standard and the encoding efficiency is decreased.

The method of the present invention described above can be embodied into a program and stored in a computer-based recording medium, such as CD-ROM, RAM, ROM, floppy disks, hard disks, optical-magnetic disks, and the like.

The method of the present invention transmits only essential bit streams for a user display mode, i.e., the binocular field/frame-based time lag display mode, or the two-dimensional monocular display mode, by selecting a pair of two-view images among multi-view images and separating them into four field objects, i.e., the odd lines of the right-eye image, the even lines of the right-eye image, the odd lines of the left-eye image and the even lines of the left-eye image, and performing object-based encoding/decoding in a multi-layer architecture using the motion and disparity compensation of the shape and texture. The receiving end can perform decoding only with the inputted essential bit streams. Therefore, the method of the present invention has advantages that it can improve the transmission efficiency, simplify the decoding process, and minimize the display time delay that may caused by the user's request for changing a display mode.

While the present invention has been described with respect to certain preferred embodiments, it will be apparent to those skilled in the art that various changes and modifications may be made without departing from the scope of the invention as defined in the following claims.

What is claimed is:

1. A multi-display supporting multi-view video object-based encoding apparatus, comprising:
   a shape abstracting means for receiving a left-eye image object video (L) and a right-eye image object video (R) from outside and abstracting a left object image (LS) and a right object image (RS), respectively, to abstract the shape information of a multi-view video;
   a data separating means for receiving the right/left-eye image object video (L/R) from outside, and the right/left shape (LS/RS) information transmitted from the shape abstracting means, and separating the videos and the shape information into odd field objects and even field objects to transmit only essential bit streams for a display mode of the multi-view video;

a shape compensation means for compensating for the distortion of the shape information (shape of the (LO,LE)/(RO,RE) object) separated into odd and even fields by the data separating means; and an object-based encoding means for receiving the object-based information inputted from the shape compensation means and the object-based information inputted from the data separating means, forming four layers, comprising an LO stream, LE stream, RO stream and RE stream, and performing motion and disparity estimation based on shape encoding and shape texture to encode object-based data that are separated into odd and even lines.

2. The apparatus as recited in claim 1, wherein the shape abstracting means includes shape separator 1 and shape separator 2 for receiving the left-eye image object video (L) and the right-eye image object video (R), respectively, and if the shape information abstracted from the left-eye image is referred to in the right-eye image processing, the shape abstractor 2 receiving the right-eye image refers to the left-eye shape information in the shape abstractor 1 and abstracts the right-eye image, or if the left-eye image shape information is not referred to, the shape abstractor 2 operates independently from the shape abstractor 1 and refers to the shape information abstracted from the reference view image, which is the left-eye image, to abstract the shape of the other-view image.

3. The apparatus as recited in claim 1, wherein the data separating means receives the left object image (LS) and the right object image (RS) corresponding to the shape information to output field-based shape information, and receives the left-eye image object video (L) and the right-eye image object video (R) to output an odd field object (LO) of the field-based left-eye image, an even field object (RE) of the right-eye image, an even field object (LE) of the left-eye image, and an odd field object (RO) of the right-eye image, which are also field-based images.

4. The apparatus as recited in claim 3, wherein the shape compensation means performs compensation on the field object-based shape outputted from the data separating means to compensate for the shape distortion that may be caused by separating the shape information on a field basis, each field containing discontinuous image lines, and compensates for the shape distortion caused by separating one shape information into two or more shape information.

5. The apparatus as recited in claim 4, wherein the object-based encoding means is formed of four layers for processing field objects so as to encode the object-based data that are separated into odd and even lines.

6. A multi-display supporting multi-view video object-based encoding method and applied to a multi-view video object-based encoding apparatus, comprising the steps of:

a) receiving a left-eye image object video (L) and a right-eye image object video (R) from outside and abstracting a left object image (LS) and a right object image (RS), respectively, to abstract the shape information of a multi-view video;

b) receiving the left-eye image object video (L) and the right-eye image object video (R) from outside, and the right/left shape (LS/RS) information transmitted from the step a), and separating the videos and the shape information into odd and even field objects to transmit only essential bit streams for a display mode of the multi-view video;

c) compensating for the distortion of the shape information (shape of the (LO,LE)/(RO,RE) object) separated into odd and even fields; and d) receiving the compensated object-based information and the separated object-based information, forming four layers, comprising and LO stream, LE stream, RO stream and RE stream, and performing motion and disparity estimation based on shape encoding and shape texture to encode the object-based data that are separated into odd and even lines.

7. A multi-display supporting multi-view video object-based transmission system, comprising:

an object-based encoding means for receiving right and left two-channel videos (L and R) for the right and left eyes from outside, separating the videos into odd and even field objects, comprising, an odd field object (LO) of the left-eye image, an even field object (RE) of the right-eye image, an even field object (LE) of the left-eye image, and an odd field object (RO) of the right-eye image, forming a main layer and sub-layers out of the separated field objects, and performing encoding, so as to transmit only essential bit streams needed for a transmitting/receiving end in accordance with a binocular three-dimensional video display mode; and a system multiplexing means for receiving the bit streams of the odd field object (LO) of the left-eye image, the even field object (RE) of the right-eye image, the even field object (LE) of the left-eye image, and the odd field object (RO) of the right-eye image, which are transmitted from the object-based encoding means, and the user display information, and multiplexing only essential bit streams.

8. The transmission system as recited in claim 7, wherein the object-based encoding means includes:

a shape abstracting unit for receiving a left-eye image object video (L) and a right-eye image object video (R) from outside and abstracting a left object image (LS) and a right object image (RS), respectively, to abstract the shape information of the multi-view video;

a data separating unit for receiving the left-eye image object video (L) and the right-eye image object video (R) from outside, and the right/left shape (LS/RS) information transmitted from the shape abstracting unit, and separating the videos and shape information into odd and even field objects to transmit only essential bit streams needed for a display mode of the multi-view video;

a shape compensation unit for compensating for the distortion of the shape information (shape of the (LO,LE)/(RO,RE) object) separated into odd and even fields by the data separating unit; and a object-based encoding unit for receiving the object-based information inputted from the shape compensation unit and the object-based information inputted from the data separating unit, forming four layers, comprising LO stream, LE stream, RO stream and RE stream, and performing motion and disparity estimation based on shape encoding and shape texture to encode object-based data that are separated into odd and even lines.

9. The transmission system as recited in claim 7, wherein the object-based encoding means uses shape and texture to perform motion and disparity estimation based on the inter-layer relationship that allows the transmission of essential bit streams only, which are required for a transmitting/receiving end in accordance with a binocular three-dimensional video display mode.

10. The transmission system as recited in claim 7, wherein the object-based encoding means uses shape and texture to perform motion and disparity estimation based on the relationship between two layers that encode the odd and even field objects of the left-eye image, or the odd and even field objects of the right-eye image, required for a two-dimensional monocular video display mode.

11. The transmission system as recited in claim 7, wherein the object-based encoding means uses shape and texture to perform motion and disparity estimation based on the relationship between two layers that encode one field object of the left-eye image and one field object of the right-eye image, required for a binocular three-dimensional field shuttering video display mode.

12. A multi-display supporting multi-view video object-based reception system, comprising:
   a system demultiplexing means for demultiplexing the bit stream transmitted from outside based on a user display mode, and outputting the demultiplexed bit stream into a multi-channel bit stream;
   an object-based decoding means for decoding the multi-channel, comprising 2-channels or 4 channels, object-based bit stream based on the user display mode; and
   a display means for performing two-dimensional video display or binocular field/frame-based time lag display based on the request from the user so as to display a video restored by the object-based video decoding means.

13. The reception system as recited in claim 12, wherein the object-based decoding means uses shape and texture to perform motion and disparity estimation based on the inter-layer relationship that allows the transmission of the essential bit streams only, which are required for a transmitting/receiving end in accordance with a binocular three-dimensional video display mode.

14. The transmission system as recited in claim 12, wherein the object-based decoding means uses shape and texture to perform motion and disparity estimation based on the relationship between two layers that encode the odd and even field objects of the left-eye image, or the odd and even field objects of the right-eye image, which are required for a two-dimensional monocular video display mode.

15. The transmission system as recited in claim 12, wherein the object-based decoding means uses shape and texture to perform motion and disparity estimation based on the relationship between two layers that encode one field object of the left-eye image and one field object of the right-eye image, required for a binocular three-dimensional field shuttering video display mode.

16. A multi-display supporting multi-view video object-based transmission method, comprising the steps of:
   a) receiving right and left two-channel images (L and R) for the right and left eyes from outside, separating the images into odd and even field objects, comprising odd field object of the left-eye image (LO), even field object of the right-eye image (RE), even field object of the left-eye image (LE), and odd field object of the right-eye image (RO), forming a main layer and sub-layers of the separated field objects and perform encoding so that only essential bit streams needed for a transmitting/receiving end are transmitted in accordance with a binocular three-dimensional video display mode; and
   b) receiving the encoded bit streams of the field objects, i.e., odd field object of the left-eye image (LO), even field object of the right-eye image (RE), even field object of the left-eye image (LE), and odd field object of the right-eye image (RO), and the user display information, and multiplexing only the essential bit streams.

17. The transmission method as recited in claim 16, wherein the encoding process of the step a) uses shape and texture to perform motion and disparity estimation by the inter-layer relationship that allows the transmission of the essential bit streams only required for a transmitting/receiving end in accordance with a binocular three-dimensional video display mode.

18. A multi-display supporting multi-view video object-based receiving method, comprising the steps of:
   a) demultiplexing the bit stream transmitted from a system multiplexing unit, and outputting the demultiplexed bit stream into a multi-channel bit stream based on a user display mode;
   b) decoding the multi-channel, comprising two-channels or four channels, input object-based bit stream based on the user display mode; and
   c) performing two-dimensional video display or binocular field/frame-based time lag display upon the request from a user to display the image restored in the step b).

19. The receiving method as recited in claim 18, wherein the decoding process of the step b) uses shape and texture to perform motion and disparity estimation by the inter-layer relationship that allows the transmission of the essential bit streams only required for a transmitting/receiving end in accordance with a binocular three-dimensional video display mode.

* * * * *